(12) United States Patent
Huether

(10) Patent No.: US 6,850,911 B1
(45) Date of Patent: Feb. 1, 2005

(54) SECURE MANIPULATION ARCHIVING RETRIEVAL AND TRANSMISSION SYSTEM FOR ELECTRONIC MULTIMEDIA COMMERCE

(75) Inventor: Michael P. Huether, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 537 days.

(21) Appl. No.: 09/589,909

(22) Filed: Jun. 7, 2000

(51) Int. Cl.⁷ .............................................. G06F 17/60
(52) U.S. Cl. .............................. 705/51; 705/53; 705/1; 396/310; 707/200
(58) Field of Search .............................. 705/1, 53, 51; 396/310; 707/200

(56) References Cited

U.S. PATENT DOCUMENTS

| | | | |
|---|---|---|---|
| 5,715,403 A | * 2/1998 | Stefik | 705/44 |
| 5,784,461 A | 7/1998 | Shaffer et al. | |
| 5,872,640 A | * 2/1999 | Cohen et al. | 358/434 |
| 6,017,157 A | 1/2000 | Garfinkle et al. | |
| 6,343,273 B1 | * 1/2002 | Nahan et al. | 705/5 |
| 6,349,373 B2 | * 2/2002 | Sitka et al. | 711/161 |

FOREIGN PATENT DOCUMENTS

| JP | 2003274378 | * 9/2003 | G06F/3/12 |
|---|---|---|---|

OTHER PUBLICATIONS www.arconis.com/products/trueimageserrver/faq.html.*

* cited by examiner

Primary Examiner—James P. Trammell
Assistant Examiner—John Winter

(74) Attorney, Agent, or Firm—Frank Pincelli

(57) ABSTRACT

A secure manipulation archiving retrieval and transmission system for electronic multi media commerce, includes: a plurality of client devices having image communication capability; an image processing center, including an application server(s), and an image archiving and storage database containing multimedia files and associated meta data; a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center; a commercial photo network including a plurality of image capture devices and image output devices connected by a communication network; an image clearinghouse connected to the commercial photo network for temporarily receiving, storing and distributing images based on a set of rules for storage and distribution of the images, and connected to the image processing center through an electronic security mechanism, whereby the commercial photo network is prevented from interacting directly with the image processing center to provide multiple levels of security to the image processing center; and a plurality of third party on-line image storage and retrieval sites connected to the image clearinghouse by a communication network.

46 Claims, 4 Drawing Sheets

SECURE MANIPULATION ARCHIVING RETRIEVAL AND TRANSMISSION SYSTEM FOR ELECTRONIC MULTIMEDIA COMMERCE

FIELD OF THE INVENTION

The present invention relates to commercial photography, and more particularly to systems for providing on-line multimedia services employing a method of secure transmission, storage, retrieval, distribution and printing of digital images over a networked communication system.

BACKGROUND OF THE INVENTION

U.S. Pat. No. 6,071,157, issued Jan. 25, 2000 to Garfinkle et al., entitled Method of Processing Digital Images and Distributing Visual Prints Produced from the Digital Images, describes a method of processing digital images and distributing visual prints from the digital images. Such a system will be referred to herein as a photo-commerce system. The system described by Garfinkle et al. includes a roll based account structure and direct database (image server) access via a WWW (World Wide Web) and HTML (hypertext markup language) interface, and direct database access by scanning centers or photographers. Additionally, a highly distributed mesh of image servers which is based upon a policy of physically deploying image servers based upon individual scanning center needs. These features generate complex systems management issues which primarily occur in the areas of configuration management, performance management and security management. The highly distributed nature of this system creates an environment in which maintaining consistency among image servers regarding software updates, version control and general administration becomes inefficient. Individual image servers comprise the overall photo commerce system and must act in a consistent and uniform manner, but are continually hampered by their nearly random physical distribution. This physical distribution and fragmentation of the system yields performance issues which are ultimately experienced by clients attempting to access image servers in the form of time to access and response time. Security management of this photo commerce system is also a critical issue. Database integrity is continually at risk because scanning centers and other client devices directly make updates, which alter account information. Security consists of account authentication and HTTPS (Secure Hypertext Transport Protocol) which is inadequate in a system of this commercial nature and size. Finally the photo commerce system is designed to maintain accounts which compile numerous JPEG images into groups identified as rolls. This presents a fundamental limitation of the photo commerce system to support and identify account ownership of individual file types, which may be JPEG, or other electronic multimedia formats.

Hence, there is a need for an improved photo commerce system that avoids or addresses more directly the security, performance and configuration issues noted above, while supporting a greater range of file management options. It is an object of the present invention to increase security and integrity of databases, reduce configuration and performance management complexity and yield a more versatile and flexible account structure.

SUMMARY OF THE INVENTION

The need is met according to the present invention by providing a secure manipulation archiving retrieval and transmission system for electronic multimedia commerce. This includes: a plurality of client devices having image communication capability; an image processing center, including an application server(s), and an image archiving and storage database containing multimedia files and associated meta data; a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center. Also included is: a commercial photo network including a plurality of image capture devices and image output devices connected by a communication network; an image clearinghouse connected to the commercial photo network for temporarily receiving, storing and distributing images based on a set of rules for storage, and distribution of the images, and connected to the image processing center through an electronic security mechanism, whereby the commercial photo network is prevented from interacting directly with the image processing center to provide multiple levels of security to the image processing center; and a plurality of third party on-line image storage and retrieval sites connected to the image clearinghouse by a communication network.

ADVANTAGES

The advantage of the present invention is that efficiency in configuration, performance and security management of a distributed service available via the WWW is addressed directly via technical design. This invention addresses areas which yield greater uniformity, scalability, robustness and reliability to a system which can be accessed by ten of thousands of client devices at any given time. It enhances the experience of those operating client devices by delivering faster data access times, greater confidence in long-term data integrity and uniformity of the experience.

In a preferred embodiment of the system, the communication network is the WWW and the host server is located at an internet gateway or co-location site on a private communication network, which allows the system to scale robustly and reliably. The use of internet gateways or co-location sites results in geographic distribution of the system that is based on the client device population. Additionally, this reduces operational management complexity by reducing distribution of equipment, deployment of multiple levels of security and aggregation of bandwidth, and use of hardened data centers which are located as virtually close to client devices as possible by utilizing internet gateway locations. Security mechanisms provide multiple gateways of authentication between databases and any party requesting an update to those databases. The distribution of databases are placed as virtually and physically close to client devices as possible while reducing the large number of image servers currently required.

DETAILED DESCRIPTION OF THE INVENTION

Figure 1:
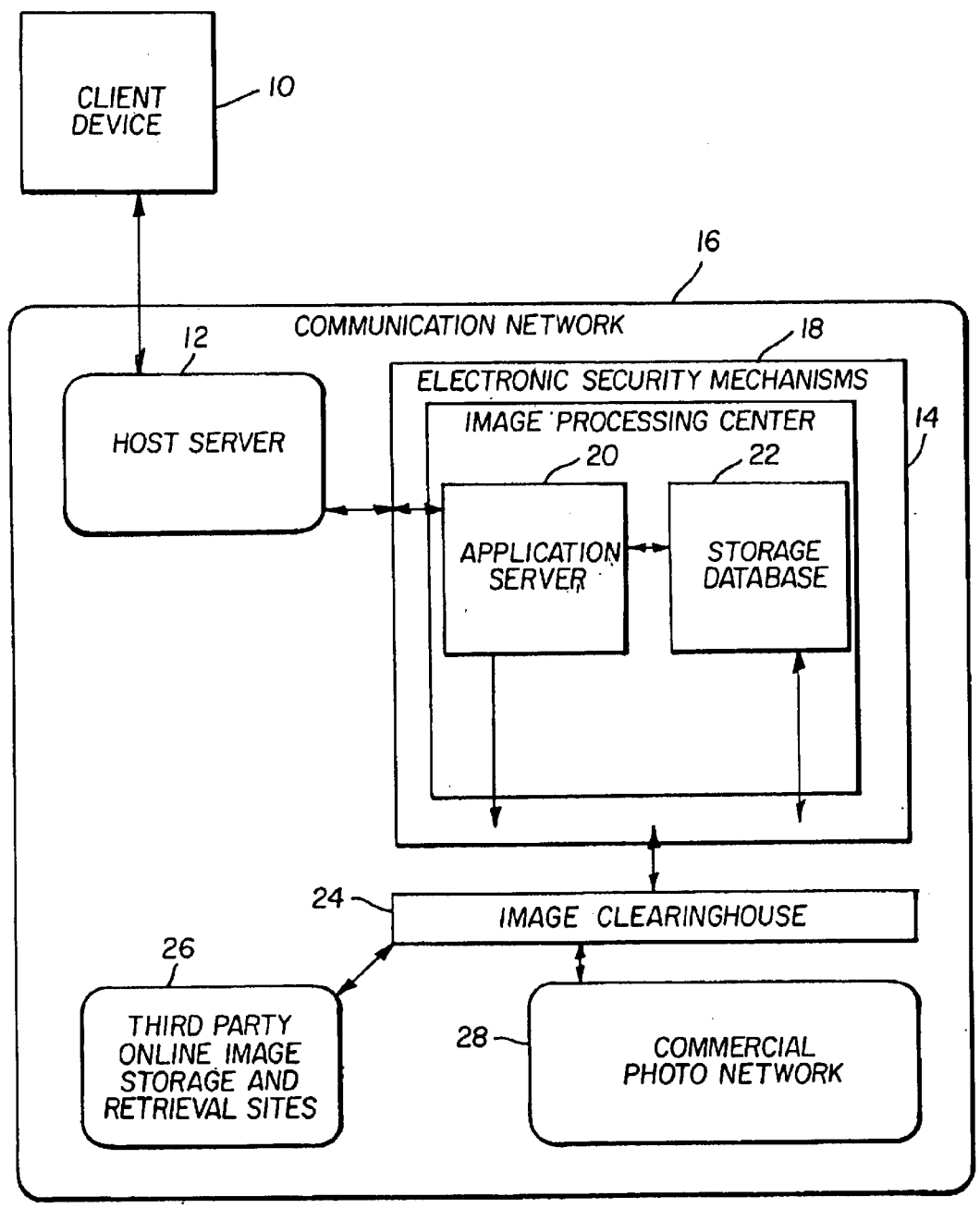
FIG. 1 is a high level schematic diagram of a secure manipulation archiving retrieval and transmission system for electronic multimedia commerce according to the present invention.

Beginning with FIG. 1, a system for performing the method of the present invention is shown. The system includes a plurality of client devices 10 (only one is shown for simplicity), which may access this system using commercially available user interfaces designed with WWW browsing capabilities such as Internet Explorer™ from the Microsoft Corporation. A plurality of host servers 12 (only one of which is shown for simplicity) create a secure connection to the client devices 10 over a communication network 16 such as the Internet. An image processing center 14 includes a plurality of application servers 20 and storage databases 22. Although the storage databases 22 shown as a single entity in FIG. 1, it is to be understood that the databases 22 represent a logical entity and may be embodied by multiple digital data storage devices located at geographically dispersed locations as is well known in the art of distributed database design. The host server 12 and image processing center 14 are connected with each other by a communication network 16, which can be a local area network LAN. The host server is located at an Internet gateway or co-location site on a private communication network thereby allowing the system to scale robustly and reliably, and deriving the benefits of aggregated bandwidth and hardened data centers.

The application server 20 performs image rendering and other related processing requests made by the host server 12, in response to requests from client devices 10. The storage databases 22 may be comprised of multiple database instances which are responsible for the management and categorization of multimedia files, metadata and image rendering scripts. Metadata is data that is stored along with the multimedia data that relates to some aspect or property of the multimedia data and can include, for example, the location of an image, image capture conditions, audio or captions related to an image, and instructions for rendering an image. The storage databases may also contain image-rendering scripts for processing images to create variations of high resolution images. When a high resolution image is modified, the image rendering scripts for modifying the high resolution image may be stored along with the unmodified high resolution image in lieu of storing a high resolution version of the modified image. Scripts for creating low, medium or thumbnail images from high resolution images may be stored along with the high resolution images in lieu of storing the low, medium or thumbnail images themselves. A low-resolution image for example would contain a 384× 256 pixel image, which is suitable for viewing on a color monitor. Whereas a high resolution image may be 3072× 2048 pixel image which is suitable for producing a high quality photographic print. The stored image rendering scripts may represent manipulations that were made to high resolution original images by a user with an application interface such as Adobe Photoshop™.

The communication network 16 may include the deployment and integration of wide area networks (WAN) such as the Internet, virtual private networks (VPN), or private networks and local area networks (LAN). An example of a LAN would be a switched gigabit Ethernet and cabling installed to EIA/TIA 356a and 356b specifications as appropriate, which can be implemented to provide communications between the application server 20 and storage database 22. An example of a WAN is the use of a common Internet connection by a client device 10 to access in some manner a host server 12 and ultimately the data or services offered by the image-processing center 14. The communication network 16 provides an electronic or data link and physical path for communication to occur between all components in the system.

The communication network 16 utilizes known protocols such as TCP/IP (transmission control protocol/Internet protocol), UDP (user datagram protocol), SSL (secure sockets layer), RPC (remote procedure call) and other variations of these protocols, such as FEC (forward error correction). Also included in the system is a plurality of electronic security mechanisms 18 (only one shown for simplicity) around each image processing center 14. The electronic security mechanisms 18 include firewall technology, access control lists which provide communications network 16 access to trusted network devices only, data encryption, device and user authentication policies which are electronically monitored, and protocol filtering. The electronic security mechanisms 18 may include programs for inspecting and identifying images or data that do not comprise a standard file format or that contain evidence of the presence of an electronic virus and discarding such images or data. Although the host server 12 is shown and described above as a separate entity from the application server 20, it will be understood that they could both reside as logical entities on a single computer, along with the electronic security mechanisms 18.

The system also includes a plurality of commercial photo networks 28 (only one being shown for simplicity) each including a plurality of image capture devices and image output devices connected by a communication network 16 to one or more image clearinghouses 24 (only one being shown for simplicity). The image clearinghouses 24 provide, to varying degrees, the functions of security, transaction accounting and image or file distribution based upon predetermined policies. The policies by which images or files are distributed by the image clearinghouses 24 are determined by the business relationships between the owners of the commercial photo networks 28, third party on-line storage and retrieval sites 26, and the image processing centers 14. The image clearinghouses 24 make use of metadata and XML information, in combination with security policies, to identify images and files for distribution. XML (eXtensible Markup Language) is a program language used to create tags to indicate the meaning of data and routing information for rendering displays.

The third party on-line image storage and retrieval sites 26 (only one being shown for simplicity) include retail photofinishers, photo specialty retailers, food and drug retailers, mass merchandisers, on-line portal companies, internet service providers and providers of on-line services. The interaction between the third party on-line image storage and retrieval sites 26 and the image clearinghouses 24 is similar to that of the commercial photo networks 28 in that the third party on-line image storage and retrieval sites 26 receive images distributed by the image clearinghouses 24 and also send images, files, metadata and XML instructions to the image clearinghouses 24. The image clearinghouses 24 then distribute that input from the third party on-line image storage and retrieval sites 26 based upon predetermined and electronically implemented policies.

Figure 2:
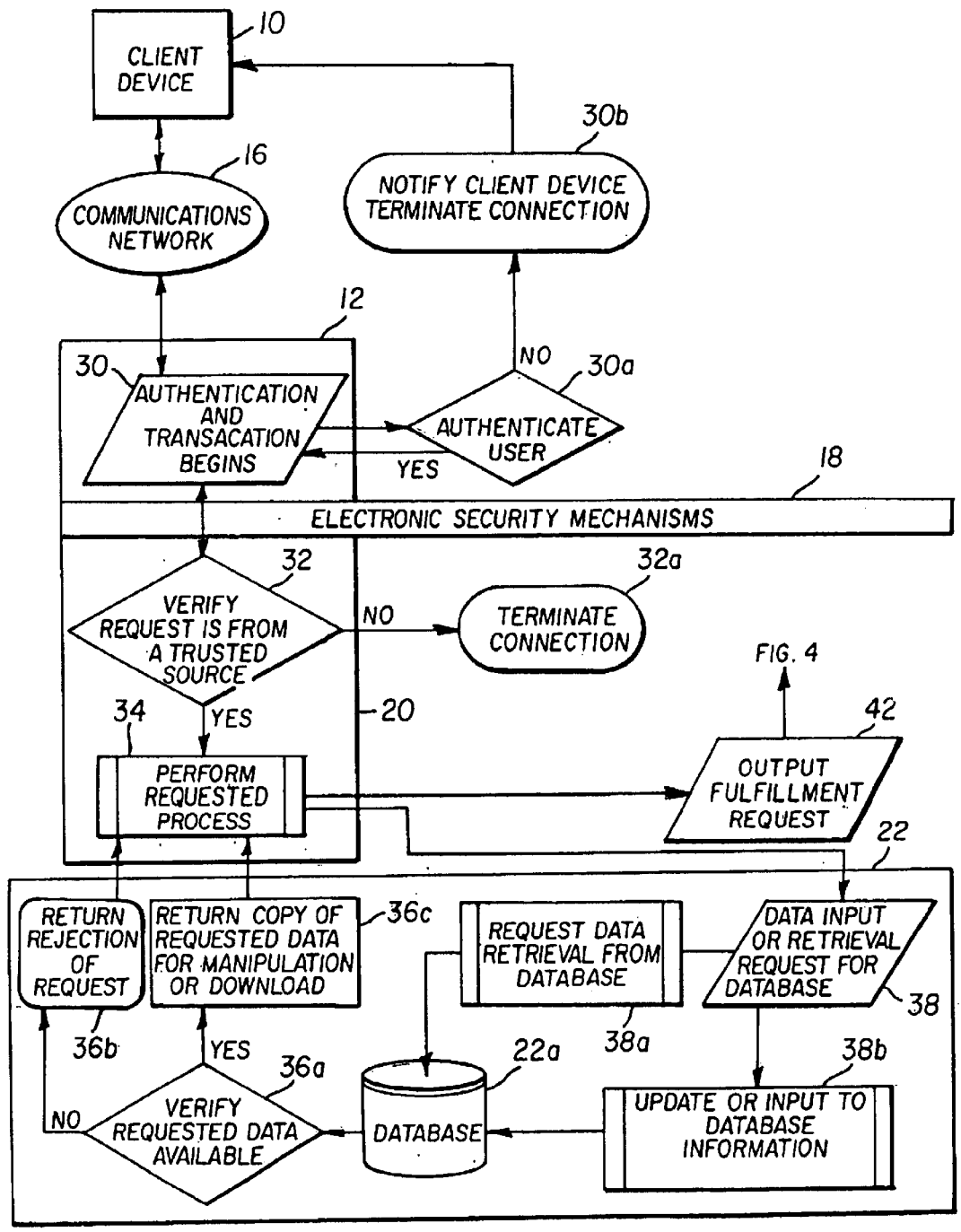
FIG. 2 is a flowchart of the secure process for a client device to retrieve or update data, which is archived by the current invention.

Referring to FIG. 2, the secure interaction between a client device 10, a communication network 16, a host server 12, and an image processing center 14 is described in greater detail. The client device 10 uses a commercially available WWW browser interface to traverse the communication network 16 and interact with the host server 12. Once the client device 10 has electronically opened communication 30 with the host server 12, authentication of a user id and password 30a can occur which will result in either a denial of authentication and connection termination 30b based upon incorrect input by the client device 10 and a response to the client device 10 reflecting this, or acceptance of the user id and password 30a which creates a transaction session 30 with the client device via an SSL (secure socket layer) or similarly secure connection.

The client device 10, when authenticated, can then process instructions on the application server 20 which will in turn perform requested processes 34 with respect to the storage database 22 or issue instructions for output fulfillment 42. When instructions initiated by the client device 10 are received by the application server 20 from the host server 12, they will be verified as having been transmitted by a trusted source as a measure of security and insurance of data integrity 32. These instructions will also traverse an electronic security mechanism 18 which is within the communication network 16 of this transaction. This electronic security mechanism 18 will insure that only trusted host and specific types of communications are occurring between the host server 12 and the image-processing center 14. If the source of the request is deemed 32 to be originating from a non-trusted host, then the connection and communication will terminate 32a ending the session. If the source of the request is deemed to be authentic 32 then the requested processes will continue. An image archiving and storage database 22 can be addressed to retrieve a single digital image, a single motion image, or a single audio file input by a client device 10 via the electronic security mechanism.

Essentially, in the most basic forms there are only three types of processes that will occur. The first is a request for output fulfillment 42; the second is a request 38b to update or deliver input to an account on the storage database 22a, which includes the manipulation or alteration of original data from the storage database 22 and the uploading of original data from another source such as a client device 10; the third is to retrieve data 38a from the storage database 22 for the purposes of alteration, download or sharing either on-line in real time or via a delayed mechanism such as email. Once the request 38 is made to the storage database 22 it will be processed accordingly and either update the database 38b, retrieve data 38a, or both, from the database 22a. The database management program will then verify if the requested data retrieval or function is available 36a. If the database management program is unable to process the request then it will return a rejection 36b to the application server 20, which ultimately notifies the client device 10. If the database is able to process the request then the appropriate response in the form of retrieved data or verification 36c is returned to the application server 20, which again ultimately notifies the client device 10. Alternatively, separate trusted application servers (not shown) that are not maintained as part of the image-processing center 14 may be employed to access the data stored on the storage data bases 22. For example an application server maintained by an internet portal may be given access to the storage data bases 22.

Figure 3:
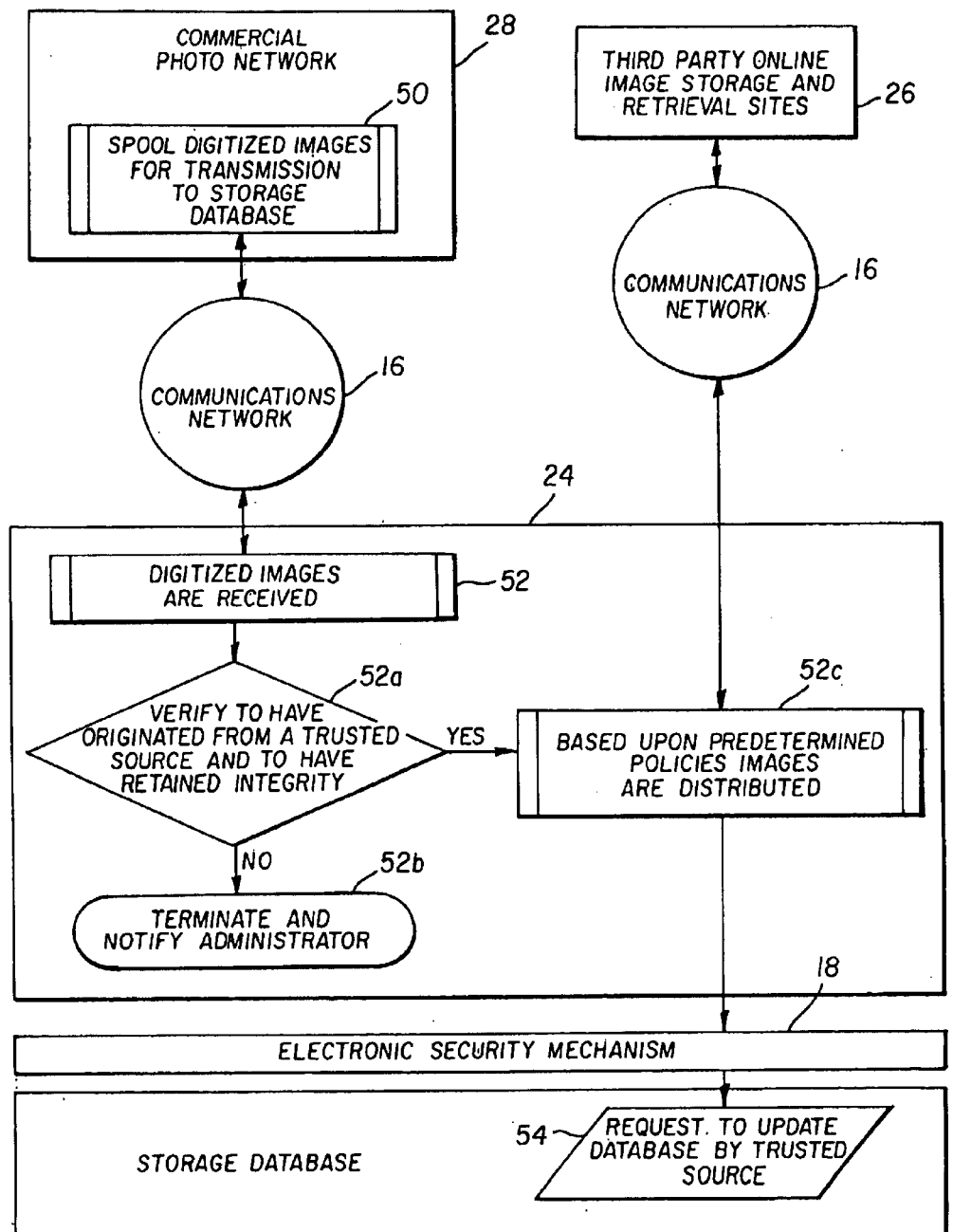
FIG. 3 is a flowchart of the secure process in which data is received by the image processing center from the commercial photo network and distributed to third party on-line storage and retrieval sites.

Referring to FIG. 3, the process of transferring professionally scanned or captured images from the commercial photo network 28 to the image clearinghouse 24 for distribution to the storage database 22 and third party on-line image storage and retrieval sites 26 is described. First within the commercial photo network 28, digitized images are collected for transmission to a storage database 50 located in the commercial photo network 28. Once this process has met predetermined limits, the digitized images and associated data such as metadata and XML information, is transmitted via communications network 16, utilizing known protocols such as TCP/IP, UDP with FEC or FTP (File Transfer Protocol) to the image clearinghouse 24. Once the images are received 52 at the image clearinghouse 24 they must be verified 52a to have originated from a trusted source and to have retained integrity. If the data is deemed to be in violation of security or data integrity policies, then the connection processes will terminate, and a system administrator will be notified 52b. Action will then be taken to resolve the discrepancy. If the data is deemed to have met all stated policies for security and data integrity, then data can be distributed according to instructions 52c. Those distribution instructions can include transmitting any variation of the data to third party on-line storage and retrieval sites 26 via a communications network 16 or through the electronic security mechanisms 18 to the storage database 22. At the storage database 22 the request to update will be received and verified to have arrived from a trusted source 54 before completing the process. A digital image can be distributed electronically to other servers that are not a part of the system by the image clearinghouse 24. The image clearing house 24 may include means for distributing digital images according to a distribution policy based upon image resolution. For example, all low resolution images may be directed to the third party on-line image storage and retrieval sights 26, and all high resolution image forwarded to the storage database 22.

Figure 4:
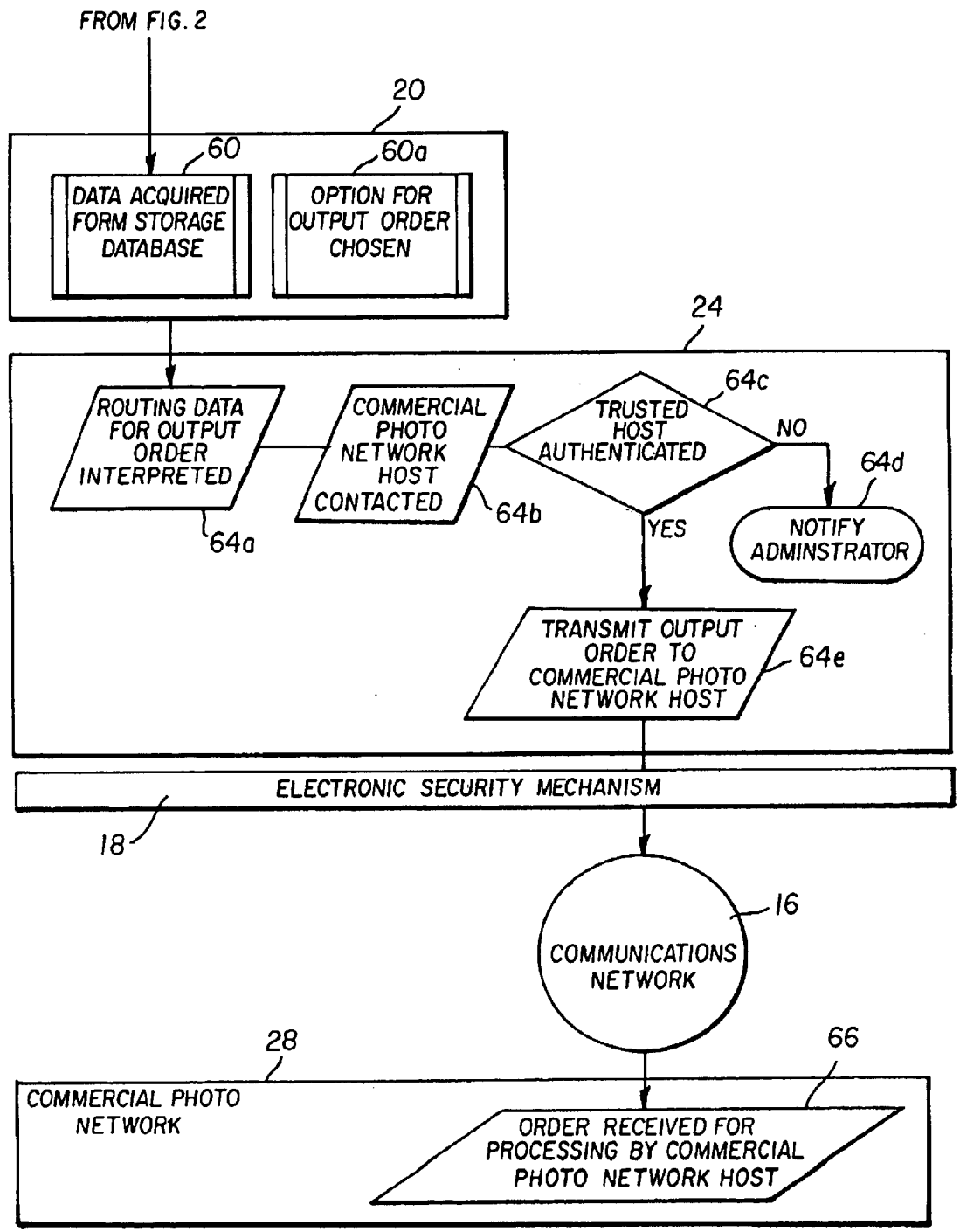
FIG. 4 is a high level flowchart of the path followed by an output request generated by a client device.

Referring to FIG. 4, the output fulfillment request process is described, which is a continuation of FIG. 2. This process assumes that a client device 10 has originated a request of the application server 20 to issue a fulfillment request to the commercial photo network 28. A fulfillment request includes final deliverables from the commercial photo network 28 such as commercial photo prints, hard goods such as coffee mugs with prints or T-shirts, or electronic media containing data from the image processing center 14.

Continuing from FIG. 2, the data has been acquired 60 by the application server 20 from the storage database 22 and options for the output order have been chosen 60a through interaction between the client device 10 and the host server 12. The host server 12 has communicated these instructions, through electronic security mechanism 18, to the application server 20. This data is then encapsulated 64a with the appropriate routing data and sent to the image clearinghouse 24 using electronic security mechanisms 18 for distribution. The commercial photo network host is contacted 64b by the image clearinghouse 24, which then authenticates 64c with the commercial photo network host. If the commercial photo network host is unable to authenticate and is deemed to be not trusted by the image clearinghouse 24, then the process is terminated 64d, the event will be logged, and a system administrator will be notified. If the commercial photo network host is authenticated and deemed to be trusted then the order will by transmitted 64e via a communications network 16. The commercial photo network 28 will receive the order 66 and then process the order. Alternatively, a stored image in the storage database 22 can be retrieved in response to a secure client request for output fulfillment by the commercial photo network 28. This action may be taken, for example, when the first copy of a high resolution image is corrupted on transmission from the image processing center 14 and a second copy of the high resolution image must be retrieved.

Thus the entire process and operation from the client device 10 through the image processing center 14 to the commercial photo network 28 or third party on-line image storage and retrieval sites 26 has occurred with the deployment of multiple levels of security and opportunities for configuration control. Additionally, performance management of this environment is made substantially easier by compartmentalizing various components of the process. This will allow each component to enjoy specific treatment of performance issues based upon the processes that only occur there. The opposite would be an attempt to maximize performance of the entire system based upon a performance issue which occurs only in an isolated area of the environment.

The invention has been described in detail with particular reference to certain preferred embodiments thereof, but it will be understood that variations and modifications can be effected within the spirit and scope of the invention.

Parts List 10 client device
12 host server
14 image processing center
16 communication network
18 electronic security mechanisms
20 application server
22 storage database
22a storage database
24 image clearinghouse
26 third party on-line storage and retrieval sites
28 commercial photo network
30 begin transaction step
30 a authentication step
30b connection termination step
32 insure integrity step
32a terminate communication step
34 perform processes step
36a verify availability of request step
36b verify function availability step
36c verify data retrieved step
38 request step
38a retrieve data step
38b request to update or deliver input step
42 requests fulfillment step
50 storage database
52 images received step
52a verify images received step
52b notify administrator step
52c instructions
54 verify step
60 data acquired step
60a output order chosen step
64a encapsulate data step
64b contact host step
64c authentication step
64d terminate process and notify administrator step
64e transmit order step
66 receive order step

What is claimed is:

1. A secure manipulation archiving retrieval and transmission system for electronic multi media commerce, comprising:

a) a plurality of client devices having image communication capability;

b) an image processing center, including an application server(s), and an image archiving and storage database containing multimedia files, associated meta data, and image-rendering scripts for processing images to create variations of high resolutions images wherein the image rendering scripts are stored in lieu of non high-resolution images;

c) a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center;

d) a commercial photo network including a plurality of image capture devices and image output devices connected by a communication network;

e) an image clearinghouse connected to the commercial photo network for temporarily receiving, storing and distributing images based on a set of rules for storage, and distribution of the images, and connected to the image processing center through an electronic security mechanism, wherein the image clearinghouse can distribute a digital image to other servers that are not a part of the system, and wherein the image clearinghouse includes means for distributing digital images according to a distribution policy based upon image resolution, whereby the commercial photo network is prevented from interacting directly with the image processing center to provide multiple levels of security to the image processing center; and f) a plurality of third party on-line image storage and retrieval sites connected to the image clearinghouse by a communication network.

2. The system claimed in claim 1 wherein the image archiving and storage database can be addressed to retrieve a single digital image input by a client device through the electronic security mechanism.

3. The system claimed in claim 1 wherein the image archiving and storage database can be addressed to retrieve a single motion image input by a client device through the electronic security mechanism.

4. The system claimed in claim 1 wherein the image archiving and storage database can be addressed to retrieve a single audio file input by a client device through the electronic security mechanism.

5. The system claimed in claim 1 wherein metadata is stored separately from image related data files.

6. The system claimed in claim 1 wherein XML (eXtensible Markup Language) data is electronically stored by the image-processing center.

7. The system claimed in claim 1 wherein the communication network between the image clearinghouse and the processing center is a public communications network, virtual private network (VPN) or private network.

8. The system claimed in claim 1, wherein the communication network is the WWW and the host server is located at an internet gateway or a co-location site.

9. A secure manipulation archiving retrieval and transmission system for electronic multi media commerce, comprising:

a) a plurality of client devices having image communication capability;

b) an image processing center, including an application server(s), and an image archiving and storage database containing multimedia files, associated meta data, and image-rendering scripts for processing images to create variations of high resolutions images wherein the image rendering scripts are stored in lieu of non high-resolution images and wherein the stored image rendering scripts represent manipulations that were made to high resolution original images by a user with an application interface;

c) a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center;

d) a commercial photo network including a plurality of image capture devices and image output devices connected by a communication network;

e) an image clearinghouse connected to the commercial photo network for temporarily receiving, storing and distributing images based on a set of rules for storage, and distribution of the images, and connected to the image processing center through an electronic security mechanism, whereby the commercial photo network is prevented from interacting directly with the image processing center to provide multiple levels of security to the image processing center; and f) a plurality of third party on-line image storage and retrieval sites connected to the image clearinghouse by a communication network.

10. A secure manipulation archiving retrieval and transmission method for electronic multimedia commerce, comprising the steps of:

a) providing a plurality of client devices having image communication capability;

b) providing an image processing center, including an application server(s), and an image archiving and storage database containing multimedia files, associated meta data, and image-rendering scripts for processing images to create variations of high resolutions images wherein the image rendering scripts are stored in lieu of non high-resolution images;

c) providing a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center;

d) providing a commercial photo network including a plurality of image capture devices and image output devices connected by a communication network;

e) providing an image clearinghouse connected to the commercial photo network for temporarily receiving, storing and distributing images based on a set of rules for storage and distribution of the images, and connected to the image processing center through an electronic security mechanism, whereby the commercial photo network is prevented from interacting directly with the image processing center to provide multiple levels of security to the image processing center;

f) providing a plurality of third party on-line image storage and retrieval sites connected to the image clearinghouse by a communication network;

g) electronically opening communication between the client device and the host server;

h) authenticating a client user id and password using the security mechanism;

i) processing instructions from the client device on the application server for output fulfillment, updating or delivering data for storage on the database, or retrieving data from the database; and j) distributing a digital image from the image clearinghouse to a server located outside the system, wherein the image clearing house distributes digital images according to a distribution policy based upon image resolution.

11. The method claimed in claim 10 wherein the instructions include storing or retrieving a single digital image from the data base.

12. The method claimed in claim 10 wherein the instructions include storing or retrieving a single motion image from the database.

13. The method claimed in claim 10 wherein the image archiving and storage database can be addressed to retrieve a single audio file input by a client device via the electronic security mechanism.

14. The method claimed in claim 10 further comprising the step of distributing a digital image from the image clearinghouse to a server located outside the system.

15. The method claimed in claim 10 wherein XML (eXtensible Markup Language) data is electronically stored by the image processing center.

16. The method claimed in claim 10 wherein the communication network between the image clearinghouse and the processing center is a public communications network, virtual private network (VPN) or private network.

17. The method claimed in claim 10, wherein the communication network is the WWW and the host server is located at an internet gateway or a co-location site.

18. The method claimed in claim 10 further comprising the step of retrieving at least one stored image from the storage database in response to a secure client request for output fulfillment by the commercial photo network.

19. The method claimed in claim 10 further comprising the step of identifying images that contain the presence of an electronic virus.

20. The method claimed in claim 10 further comprising the step of discarding images that do not comprise a standard file format or contain evidence of the presence of an electronic virus.

21. The method claimed in claim 10 further comprising the step of employing separate trusted application servers that are not maintained as part of the image-processing center access to the data stored on the storage data bases.

22. A secure manipulation archiving retrieval and transmission method for electronic multimedia commerce, comprising the steps of:

a) providing a plurality of client devices having image communication capability;

b) providing an image processing center, including an application server(s), and an image archiving and storage database containing multimedia files, associated meta data, and image-rendering scripts for processing images to create variations of high resolutions images wherein the image rendering scripts are stored in lieu of non high-resolution images and represent manipulations that were made to high resolution original images by a user with an application interface;

c) providing a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center;

d) providing a commercial photo network including a plurality of image capture devices and image output devices connected by a communication network;

e) providing an image clearinghouse connected to the commercial photo network for temporarily receiving, storing and distributing images based on a set of rules for storage and distribution of the images, and connected to the image processing center through an electronic security mechanism, whereby the commercial photo network is prevented from interacting directly with the image processing center to provide multiple levels of security to the image processing center;

f) providing a plurality of third party on-line image storage and retrieval sites connected to the image clearinghouse by a communication network;

g) electronically opening communication between the client device and the host server;

h) authenticating a client user id and password using the security mechanism; and i) processing instructions from the client device on the application server for output fulfillment, updating or delivering data for storage on the database, or retrieving data from the database.

23. A secure manipulation archiving retrieval and transmission system for electronic multi media commerce, comprising:

a) a plurality of client devices having image communication capability;

b) an image processing center, including an application server(s), and an image archiving and storage database containing multimedia files, associated meta data, and image-rendering scripts for processing images to create variations of high resolutions images wherein the stored image rendering scripts represent manipulations that were made to high resolution original images by a user with an application interface;

c) a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center;

d) a commercial photo network including a plurality of image capture devices and image output devices connected by a communication network;

e) an image clearinghouse connected to the commercial photo network for temporarily receiving, storing and distributing images based on a set of rules for storage, and distribution of the images, and connected to the image processing center through an electronic security mechanism, whereby the commercial photo network is prevented from interacting directly with the image processing center to provide multiple levels of security to the image processing center; and f) a plurality of third party on-line image storage and retrieval sites connected to the image clearinghouse by a communication network.

24. The system claimed in claim 23 wherein the image archiving and storage database can be addressed to retrieve a single digital image input by a client device through the electronic security mechanism.

25. The system claimed in claim 23 wherein the image archiving and storage database can be addressed to retrieve a single motion image input by a client device through the electronic security mechanism.

26. The system claimed in claim 23 wherein the image archiving and storage database can be addressed to retrieve a single audio file input by a client device through the electronic security mechanism.

27. The system claimed in claim 23 wherein the image clearinghouse can distribute a digital image to other servers that are not a part of the system.

28. The system claimed in claim 27 wherein the image clearinghouse includes means for distributing digital images according to a distribution policy based upon image resolution.

29. The system claimed in claim 23 wherein metadata is stored separately from image related data files.

30. The system claimed in claim 23 wherein XML (eXtensible Markup Language) data is electronically stored by the image-processing center.

31. The system claimed in claim 27 wherein the communication network between the image clearinghouse and the processing center is a public communications network, virtual private network (VPN) or private network.

32. The system claimed in claim 23, wherein the communication network is the WWW and the host server is located at an internet gateway or a co-location site.

33. A secure manipulation archiving retrieval and transmission method for electronic multimedia commerce, comprising the steps of:

a) providing a plurality of client devices having image communication capability;

b) providing an image processing center, including an application server(s), and an image archiving and storage database containing multimedia files, associated meta data, and image-rendering scripts for processing images to create variations of high resolutions images wherein the stored image rendering scripts represent manipulations that were made to high resolution original images by a user with an application interface;

c) providing a host server connected to client devices by a communication network, and to the image processing center through an electronic security mechanism, the host server providing the client devices indirect access to the image processing center through the electronic security mechanism, whereby the client devices are prevented from interacting directly with the image processing center to provide multiple levels of security to the image processing center;

d) providing a commercial photo network including a plurality of image capture devices and image output devices connected by a communication network;

e) providing an image clearinghouse connected to the commercial photo network for temporarily receiving, storing and distributing images based on a set of rules for storage and distribution of the images, and connected to the image processing center through an electronic security mechanism, whereby the commercial photo network is prevented from interacting directly with the image processing center to provide multiple levels of security to the image processing center;

f) providing a plurality of third party on-line image storage and retrieval sites connected to the image clearinghouse by a communication network;

g) electronically opening communication between the client device and the host server;

h) authenticating a client user id and password using the security mechanism; and i) processing instructions from the client device on the application server for output fulfillment, updating or delivering data for storage on the database, or retrieving data from the database.

34. The method claimed in claim 33 wherein the instructions include storing or retrieving a single digital image from the database.

35. The method claimed in claim 33 wherein the instructions include storing or retrieving a single motion image from the database.

36. The method claimed in claim 33 wherein the image archiving and storage database can be addressed to retrieve a single audio file input by a client device via the electronic security mechanism.

37. The method claimed in claim 33 further comprising the step of distributing a digital image from the image clearinghouse to a server located outside the system.

38. The method claimed in claim 37 wherein the image clearinghouse distributes digital images according to a distribution policy based upon image resolution.

39. The method claimed in claim 33 wherein metadata is stored separately from image related data files.

40. The method claimed in claim 33 wherein XML (eXtensible Markup Language) data is electronically stored by the image processing center.

41. The method claimed in claim 33 wherein the communication network between the image clearinghouse and the processing center is a public communications network, virtual private network (VPN) or private network.

42. The method claimed in claim 33, wherein the communication network is the WWW and the host server is located at an internet gateway or a co-location site.

43. The method claimed in claim 33 further comprising the step of retrieving at least one stored image from the storage database in response to a secure client request for output fulfillment by the commercial photo network.

44. The method claimed in claim 33 further comprising the step of identifying images that contain the presence of an electronic virus.

45. The method claimed in claim 33 further comprising the step of discarding images that do not comprise a standard file format or contain evidence of the presence of an electronic virus.

46. The method claimed in claim 33 further comprising the step of employing separate trusted application servers that are not maintained as part of the image-processing center access to the data stored on the storage databases.

* * * * *